March 30, 1954     H. VERMETTE     2,673,742
CHUCK FOR PIPE WORKING MACHINES
Filed May 13, 1949     3 Sheets-Sheet 1
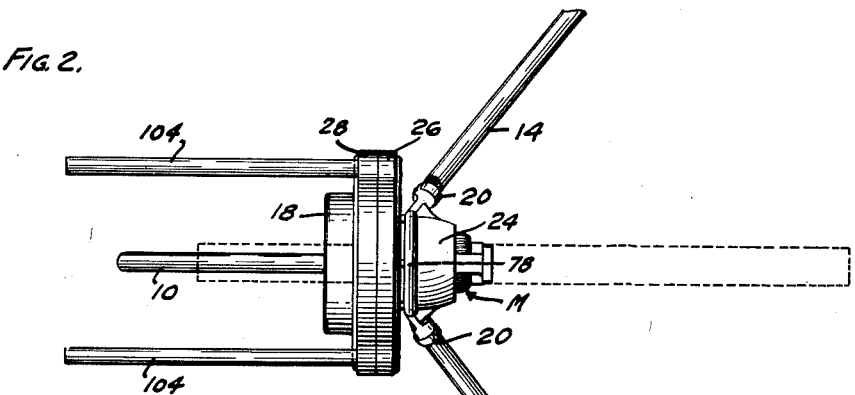
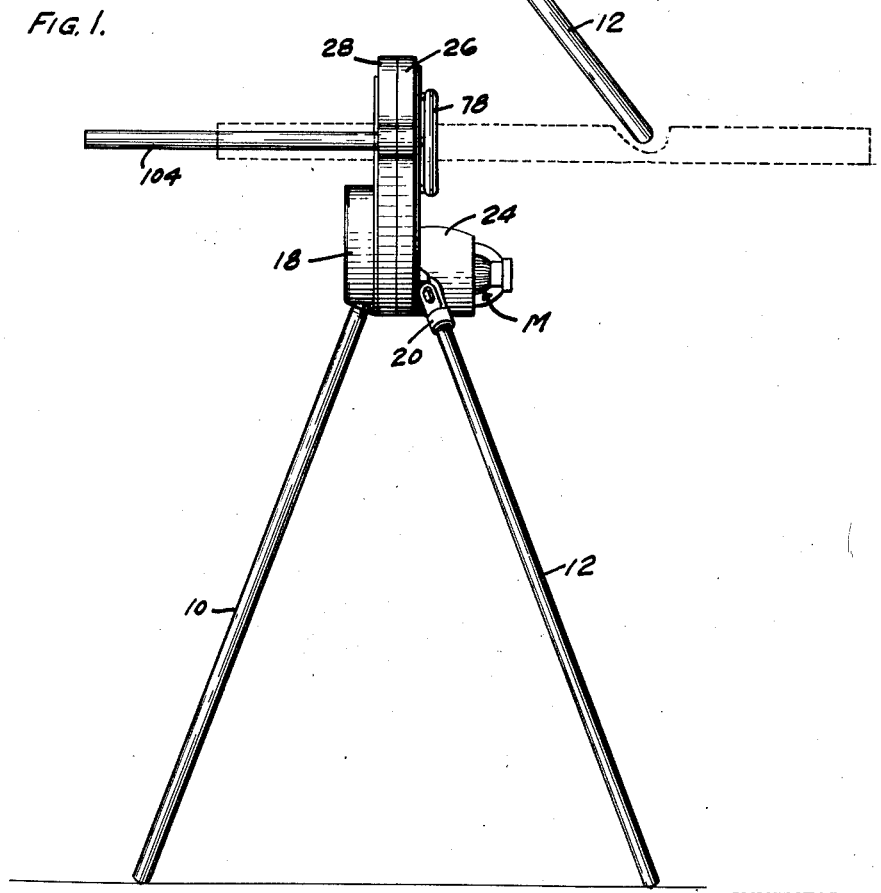
INVENTOR.
HOWARD VERMETTE
BY John B. Harty
ATTORNEY.

March 30, 1954 H. VERMETTE 2,673,742
CHUCK FOR PIPE WORKING MACHINES
Filed May 13, 1949 3 Sheets-Sheet 2
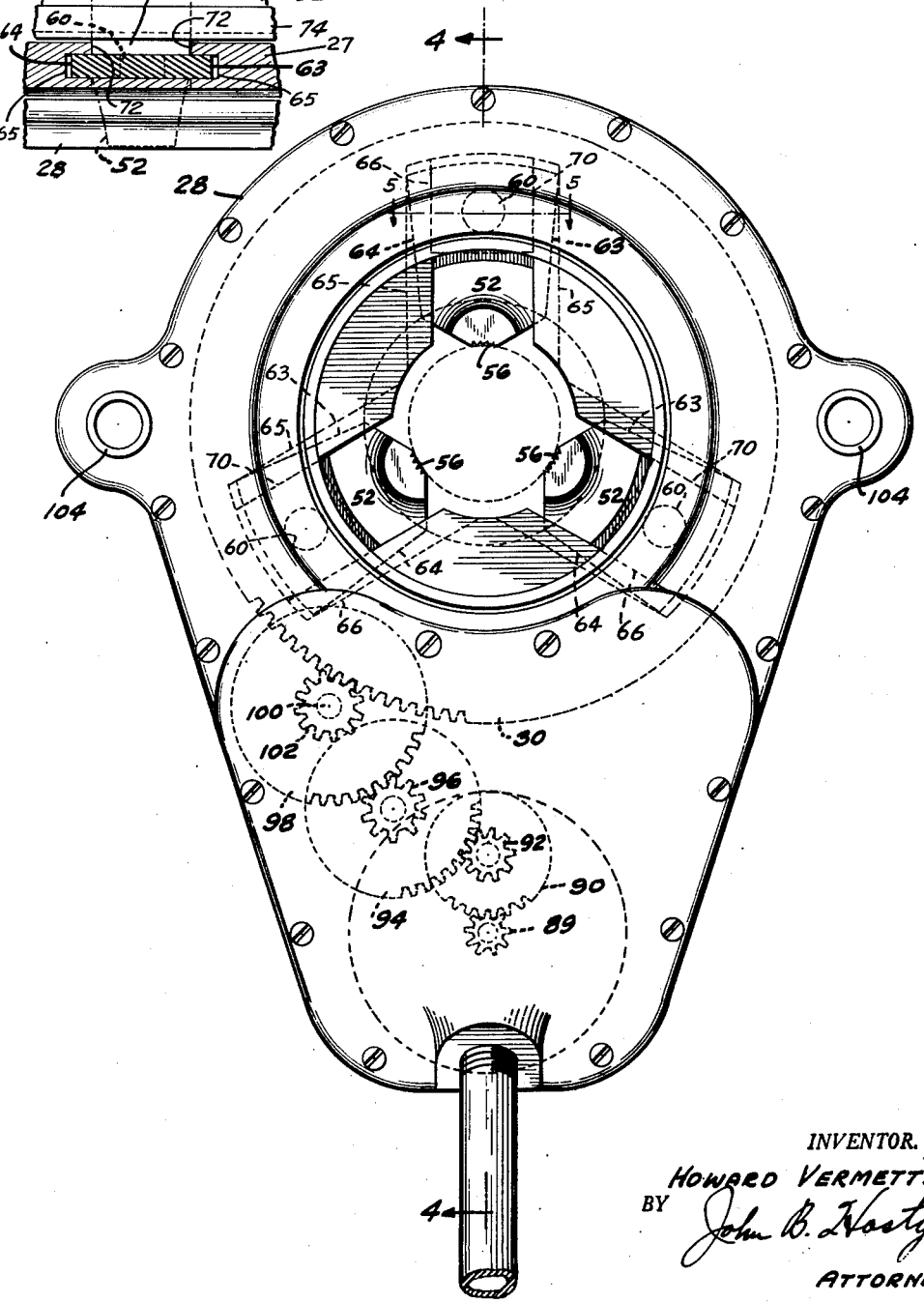
INVENTOR.
HOWARD VERMETTE
BY
ATTORNEY.

March 30, 1954  H. VERMETTE  2,673,742
CHUCK FOR PIPE WORKING MACHINES
Filed May 13, 1949  3 Sheets-Sheet 3
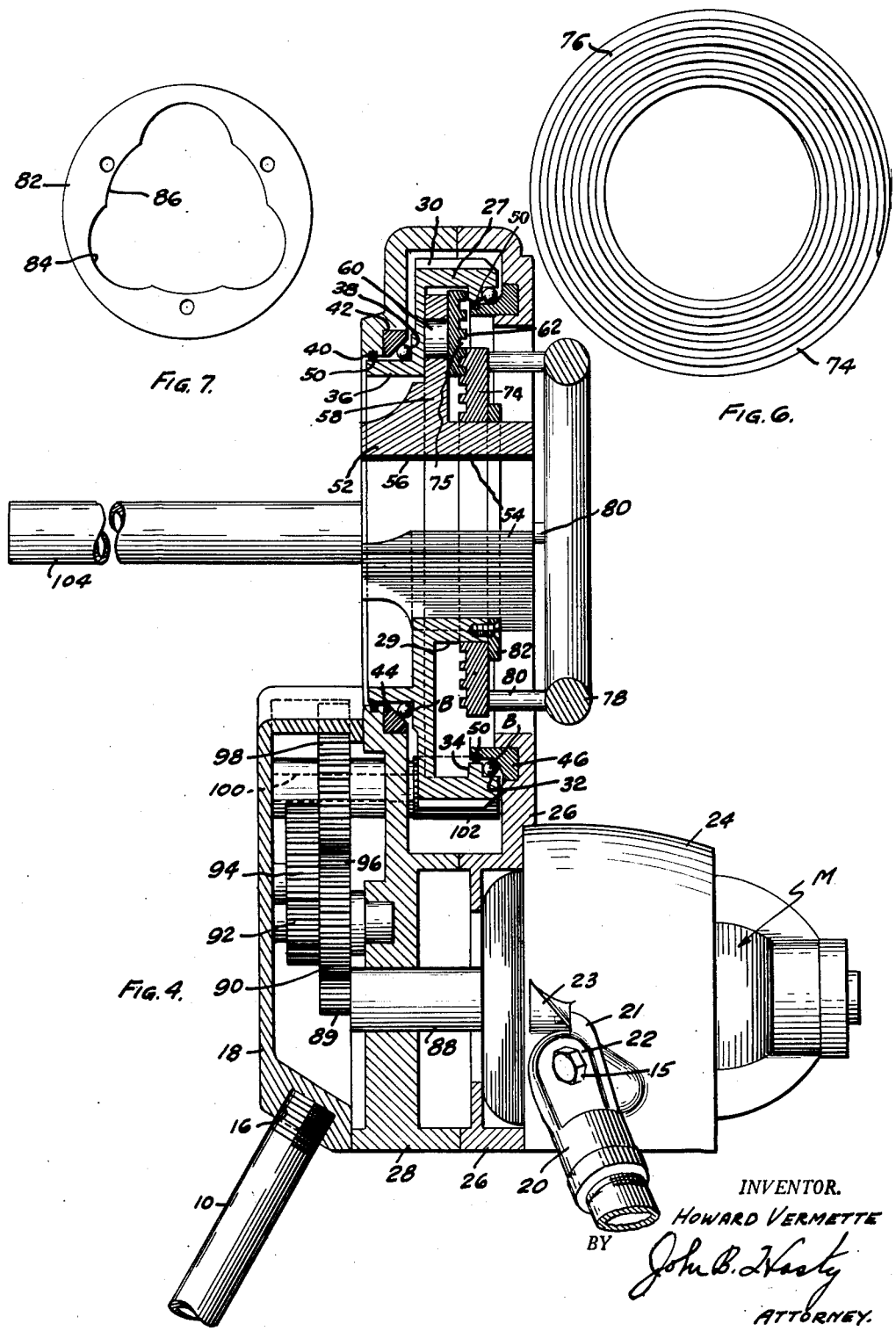
INVENTOR.
HOWARD VERMETTE
BY John B. Hasty
ATTORNEY.

Patented Mar. 30, 1954

2,673,742

UNITED STATES PATENT OFFICE 2,673,742

CHUCK FOR PIPE WORKING MACHINES

Howard Vermette, Hammond, Ind.

Application May 13, 1949, Serial No. 93,102

3 Claims. (Cl. 279—114)

My invention relates to improvements in a portable pipe threading machine.

My invention relates more particularly to machines of the class described that are comparatively light and compact so that they may be utilized by plumbers and other pipe fitters or artisans who usually carry working equipment to a house, apartment building or other place where pipe cutting, threading and fitting is to be done, the invention being particularly directed to a machine of the type that is easily set up for operation and easily and quickly disassembled or collapsed for transportation.

The principal object of the present invention is to provide a pipe holding or turning device driven by means of a compact power plant assembled therein whereby hand cutting, threading or reaming tools may be applied to the pipe or rod being driven for the purpose of operating upon the same.

A further object of the invention is to provide an improved machine of the type described which is easily and quickly adjustable to receive different size pipes or rods within limits and capable of effective turning or rotating of the same so that they may be worked upon.

A further object of the invention is to provide in a machine of the type described improved chuck construction including movable jaws capable of receiving and effectively gripping a pipe or rod for the purpose of rotating the same.

A further object of the invention is to provide an improved mounting for jaws of the type described whereby the same have limited pivotal movement so that their gripping action upon a pipe or rod to securely hold the same is similar to that of the jaws of ordinary pipe wrenches.

A further object of the invention is to provide in a machine of the type described a construction wherein a rigid and firm base is provided, yet which can easily be collapsed and folded to require a minimum of space in storage or transportation, and an assembly that is sufficiently light so that the average person can carry the same about without it becoming an undue burden.

Other objects and advantages will be more apparent from the following description wherein reference is had to the accompanying three sheets of drawings, upon which Fig. 1 is a side elevational view of my improved pipe threading machine in operating position, a length of pipe being shown in position thereon in dotted lines;

Fig. 2 is a plan view of the same showing the manner in which the tripod base is positioned;

Fig. 3 is an enlarged front elevational view of the motor driven chuck and associated parts;

Fig. 4 is a vertical sectional view therethrough taken on the line 4—4 of Fig. 3;

Fig. 5 is a fragmentary cross-sectional view taken generally on the line 5—5 of Fig. 3;

Fig. 6 is a face view of the scroll which I employ to operate the work holding jaws; and Fig. 7 is a face view of the retaining collar which I employ to assemble the scroll follower and jaws in the chuck.

In the embodiment of the invention which I have chosen to illustrate and describe, Fig. 1 shows the general assembly which may include the three leg members 10, 12 and 14, the leg member 10 being screw-threadedly mounted at a desired angle in a tapped opening 16 in the gear housing 18, the legs 12 and 14 each having brackets 20 provided with ears 22 for fastening to opposite sides of the motor housing 24.

The motor housing 24 may be fastened to the part 26 of the split housing, the housing also including the part 28 and the gear housing 18. The split housing comprising the two parts 26 and 28 has a chuck member 27 mounted for rotation therein in a manner which will be hereinafter more clearly explained.

The chuck 27 is cylindrical in shape and provided about its outer periphery with gear teeth 30. On the rear face I provide a reduced cylindrical shoulder 32 and an inwardly turned cylindrical ledge 34. Upon its forward face I provide a reduced cylindrical shoulder 36 and a circular ledge 38 extending outwardly from the shoulder 36. The front housing 28 is provided with a circular opening 40 within which the cylindrical shoulder 36 is telescoped. It is also provided with an enlarged bore 42 to receive a generally triangularly shaped hardened ring 44. A circular row of ball bearings B positioned between the hardened ring 44 in the housing and the corner formed by the ledge 38 and the shoulder 36 provide an effective and easily running bearing for the chuck in the front housing.

A similar bearing construction is provided in the back housing 26, the circular row of ball bearings B being positioned between the circular shoulder 34 and groove 32 in the chuck 27, and an inwardly directed ring member 46 appropriately mounted in the housing 26 and telescoped within the opening formed by the circular ledge 34. A felt backing ring 50 may be provided adjacent each of the bearing members to prevent the escape of lubricant at the bearing.

Means for gripping a pipe, rod or other work piece in the chuck 27 may comprise the jaw members 52 which have the leg portions 54 provided with teeth 56 on their work engaging surfaces.

The jaw members may have upright portions 58 which are mounted upon a pivot pin 60 secured to the scroll followers 62. As can be seen in Fig. 3, the side walls 63 and 64 of the jaws 52 are tapered so that limited arcuate action at the teeth 56 is obtained about the pivot 60 as the jaws are moved in and out in the guide slot 65 of the chuck 27, the guide slot 65 having parallel walls and the jaws 52 having tapered walls so that rotation about the pivot 60 may be had.

The scroll follower 62 (see Fig. 5) is formed with parallel side walls 66 and 70 which move inwardly or outwardly in a straight line in the guide slot 72 formed in the chuck 27, the guide slot being formed with parallel side walls.

Means for moving the plurality of jaws 52 inwardly or outwardly from the axis of the chuck consist of a scroll 74 (see Fig. 6), the scroll being provided upon its face with a spiral groove 73, the groove meshing with the complementary grooves 75 in the scroll followers 62. Means for rotating the scroll follower may include a hand wheel 78 secured to the scroll by means of a plurality of pin members 80.

A collar 82 provided with a plurality of arcuate slots 84 formed in the opening 86 therethrough may be fastened to the hub 29 of the chuck 27 by means of a plurality of screw members.

The drive for the chuck may include a suitable motor M, preferably a reversible type motor, which has a drive shaft extending through a suitable bearing 88 with a drive pinion 89 secured on the end of the same in the gear housing 18. The pinion may drive a face gear 90 mounted upon a shaft journalled in the front housing 28 and the gear housing 18 and carries a reduced pinion 92 secured thereto. The pinion 92 drives a face gear 94 suitably journalled in the gear housing and carrying at its end a reduced pinion 96 which in turn drives a face gear 98 mounted upon the shaft 100. The shaft 100 carries a pinion 102 which meshes with the gear teeth 30 about the periphery of the chuck. By means of the train of gears above described the speed from the motor M is sufficiently reduced so that the rotation of the chuck 27 carries with it the pipe, rod or shaft to be worked upon and is rotated at the desired working speed.

In normal use, such as in cutting pipe threads upon the ends of pipe, a die or other suitable threading tool may be started over the end of the pipe, the die or other threading tool normally having handles so that one of them may come to rest to prevent rotation against either one of the parallel rod members 104 which are rigidly secured to and extend forward from the front housing 28. Thus, while the motor driven chuck is rotating the work in the nature of a pipe, rod or similar object, the cutting, threading or reaming tool is held against rotation by one of the horizontal rods 104 and the operation upon the pipe is easily effected.

After a pipe has been threaded it is desirable to back off the threading die, and accordingly the motor is reversed with the result that the die is easily backed off of the work.

When it is desired to transport or store the portable machine herein described, the legs 12 and 14 which are mounted upon pivot bolts 15 can be folded forward to generally lie parallel with the rigid leg 10 and the unit may be carried or stored in this compact manner. When set up in working position such as shown in the drawings, the ear 21 on the pipe bracket 20 comes to rest against the struck-out shoulders 23 on the two sides of the motor housing 24.

While I have illustrated and described a specific embodiment of the invention, it will be apparent to those skilled in the art that changes and modifications may be made in the details shown, and I do not wish to be limited in any particular; rather what I desire to secure and protect by Letters Patent of the United States is:

1. The combination with a housing, a chuck mounted therein for rotation and having a face gear about its periphery, said chuck also having a plurality of sets of parallel radially disposed slots in one side thereof, a scroll follower slidably mounted in one of each set of said slots, a jaw member pivotally carried by each of said scroll followers, said jaw member having tapered side walls slidably mounted in the other of each set of said slots, a rotatable scroll member mounted on the hub of said chuck, each of said scroll members having a spiral groove on its side adapted to engage a ridge on each of said scroll followers to move the same toward or away from the center of said chuck, thereby moving said pivoted jaws toward work engaging position, said jaws having teeth upon their work engaging faces to wedgingly grip the same when swung about their pivots.

2. The combination with a housing, a chuck mounted for rotation therein and having a face gear about its periphery, said chuck also having a plurality of sets of parallel radially disposed slots in one side thereof, all of said slots having parallel side walls, a scroll follower slidably mounted in one of each of said sets of slots, a pivotally mounted jaw member carried by each of said scroll followers, a rotatable scroll member mounted on the hub of said chuck, said scroll member having a spiral groove on its side adapted to engage a ridge on each of said scroll followers to move the same toward or away from the center of said chuck, said jaw members having axially tapered side walls engaging against the parallel side walls of one of each of said sets of slots in the side of said chuck to limit pivotal movement of the same whereby a gripping or wedging action is obtained by said jaws against a work piece in said chuck.

3. For a pipe working machine the combination of a housing, a chuck mounted therein and having a tubular hub to receive a pipe therethrough, jaw members therein to hold said pipe against rotation, said chuck having a face gear about its periphery and a plurality of radial slots on one side of the same, a plurality of radial jaw slots in said chuck, a plurality of scroll followers, each having a portion extending through one of said slots and slidably movable therein, a rotatable scroll member mounted on the hub of said chuck, said scroll member having a spiral groove in one face thereof, each of said scroll followers having a ridge on one side engaging the groove in said scroll member, pivot pins extending forward from each of said scroll followers, a jaw member having teeth on its work-engaging face mounted on each of said pivot pins and extending through a slot with parallel side walls in said chuck, each of said jaw members having tapered side walls, means for turning said scroll member and motor means for rotating said chuck, each of said jaw members adapted to engage a pipe with a wedging action when its tapered side walls engage against the parallel side walls of said radial jaw slots.

HOWARD VERMETTE.

References Cited in the file of this patent

UNITED STATES PATENTS

| Number | Name | Date |
|---|---|---|
| 142,239 | Johnson | Aug. 26, 1873 |
| 749,794 | Inman | Jan. 19, 1904 |
| 841,396 | Hoefer | Jan. 15, 1907 |
| 1,199,917 | Oster | Oct. 3, 1916 |
| 1,230,173 | Kremer | June 19, 1917 |
| 1,344,280 | Vosper | June 22, 1920 |
| 1,455,017 | Axelson | May 15, 1923 |
| 1,697,532 | Lilleberg | Jan. 1, 1929 |
| 2,019,814 | Holmes et al. | Nov. 5, 1935 |
| 2,191,692 | Gould et al. | Feb. 27, 1940 |
| 2,278,768 | Calvert | Apr. 7, 1942 |
| 2,429,524 | Oetzel | Oct. 21, 1947 |
| 2,523,374 | Jensen | Sept. 26, 1950 |